US008752393B2

(12) United States Patent
Bowman

(10) Patent No.: US 8,752,393 B2
(45) Date of Patent: Jun. 17, 2014

(54) SYSTEMS, APPARATUSES, AND METHODS OF GAS TURBINE ENGINE CONTROL

(75) Inventor: Ray F. Bowman, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1211 days.

(21) Appl. No.: 12/645,308

(22) Filed: Dec. 22, 2009

(65) Prior Publication Data

US 2010/0162718 A1 Jul. 1, 2010

Related U.S. Application Data

(60) Provisional application No. 61/204,039, filed on Dec. 31, 2008.

(51) Int. Cl.
*F02C 9/00* (2006.01)
*F02C 9/16* (2006.01)

(52) U.S. Cl.
USPC ............................. 60/793; 60/39.24; 60/795

(58) Field of Classification Search
USPC ........... 60/793, 39.24–39.27, 39.281–39.282, 60/794–795, 782, 785, 39.091, 779
See application file for complete search history.

(56) References Cited

U.S. PATENT DOCUMENTS

| 2,541,532 | A | * | 2/1951 | Mosser ........................ 60/39.15 |
| 3,152,444 | A | * | 10/1964 | Peczkowski et al. ........... 60/791 |
| 3,747,340 | A | * | 7/1973 | Fenton et al. .................... 60/223 |
| 3,893,291 | A | | 7/1975 | Davis et al. |
| 4,044,552 | A | | 8/1977 | West |
| 4,588,954 | A | * | 5/1986 | Seymour ......................... 327/95 |
| 4,625,510 | A | | 12/1986 | Evans |
| 6,357,219 | B1 | | 3/2002 | Dudd, Jr. |
| 2004/0050066 | A1 | * | 3/2004 | Keller ............................. 60/773 |
| 2005/0178892 | A1 | * | 8/2005 | Box et al. ........................ 244/60 |
| 2008/0115503 | A1 | * | 5/2008 | Vasquez et al. ................. 60/785 |

* cited by examiner

*Primary Examiner* — Andrew Nguyen
(74) *Attorney, Agent, or Firm* — Krieg DeVault LLP

(57) ABSTRACT

One embodiment according to the present invention is a unique system for gas turbine engine control. Other embodiments include unique apparatuses, systems, devices, and methods relating to gas turbine engines. Further embodiments, forms, objects, features, advantages, aspects, and benefits of the present invention shall become apparent from the following description and drawings.

24 Claims, 6 Drawing Sheets

SYSTEMS, APPARATUSES, AND METHODS OF GAS TURBINE ENGINE CONTROL

CROSS REFERENCE TO RELATED APPLICATIONS

The present application claims the benefit of U.S. Provisional Patent Application No. 61/204,039, filed Dec. 31, 2008, and is incorporated herein by reference.

FIELD OF THE INVENTION

The present invention relates generally to gas turbine engines and more particularly to systems, apparatuses, and methods of gas turbine engine control.

BACKGROUND

Gas turbine engines are an efficient source of energy and have proven useful to propel and power aircraft, for electricity generation, as well as for other uses. One aspect of gas turbine engines is that they include systems, subsystems, and elements, such as, mechanical, electrical, and electro-mechanical systems, subsystems, and elements that must be controlled during operation. Numerous gas turbine control issues exist. During some gas turbine engine operating conditions there is a delay or lag in mechanical response to commanded engine operation. Such delays or lags can result in transient operating conditions which briefly exceed prescribed engine operation limits or desired operation ranges, but which do not require operator intervention because corrective engine operation has already been commanded. There is a concern that operators may take inappropriate or unsafe action not understanding that corrective action is underway. Proposed approaches involve limiting or clipping a signal indicating that a prescribed engine operation limits or desired operation ranges has been exceeded. Such approaches are unsatisfactory because they mask true operation issues requiring operator intervention. Thus, there is a need for systems, apparatuses, and methods of gas turbine engine control disclosed herein.

SUMMARY

One embodiment according to the present invention is a unique system for gas turbine engine control. Other embodiments include unique apparatuses, systems, devices, software, hardware, methods, and combinations of these and/or other aspects relating to gas turbine engines. Further embodiments, forms, objects, features, advantages, aspects, and benefits of the present invention shall become apparent from the following description and drawings.

DETAILED DESCRIPTION

Figure 1:
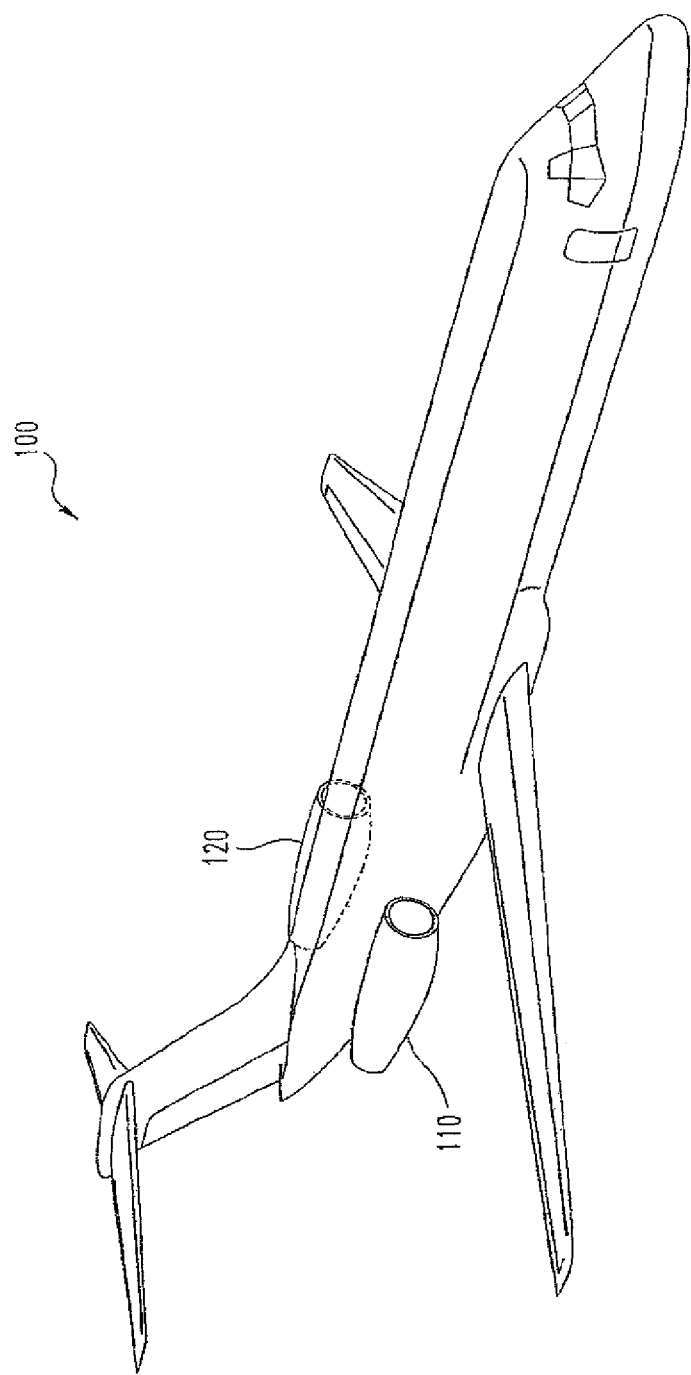
FIG. 1 is a perspective view of an aircraft propelled by two gas turbine engines.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1 there is shown airplane 100 including gas turbine engine engines 110 and 120 which operate to propel airplane 100. Airplane 100 is one example of a use to which gas turbine engines can be put. There are a variety of additional applications for gas turbine engines, including, for example, electricity generation, pumping sets for gas and oil transmission lines, land and naval propulsion, and still other applications. It should be appreciated that systems, apparatuses, and methods and other embodiments according to the present invention can be used in connection with the gamut of gas turbine engine applications including aircraft applications which include helicopters, airplanes, missiles, unmanned space devices and any other substantially similar devices. Thus, while the following description is in the context of a gas turbine engine suitable for aircraft propulsion, the invention broadly applies to the aforementioned applications and others.

Figure 2:
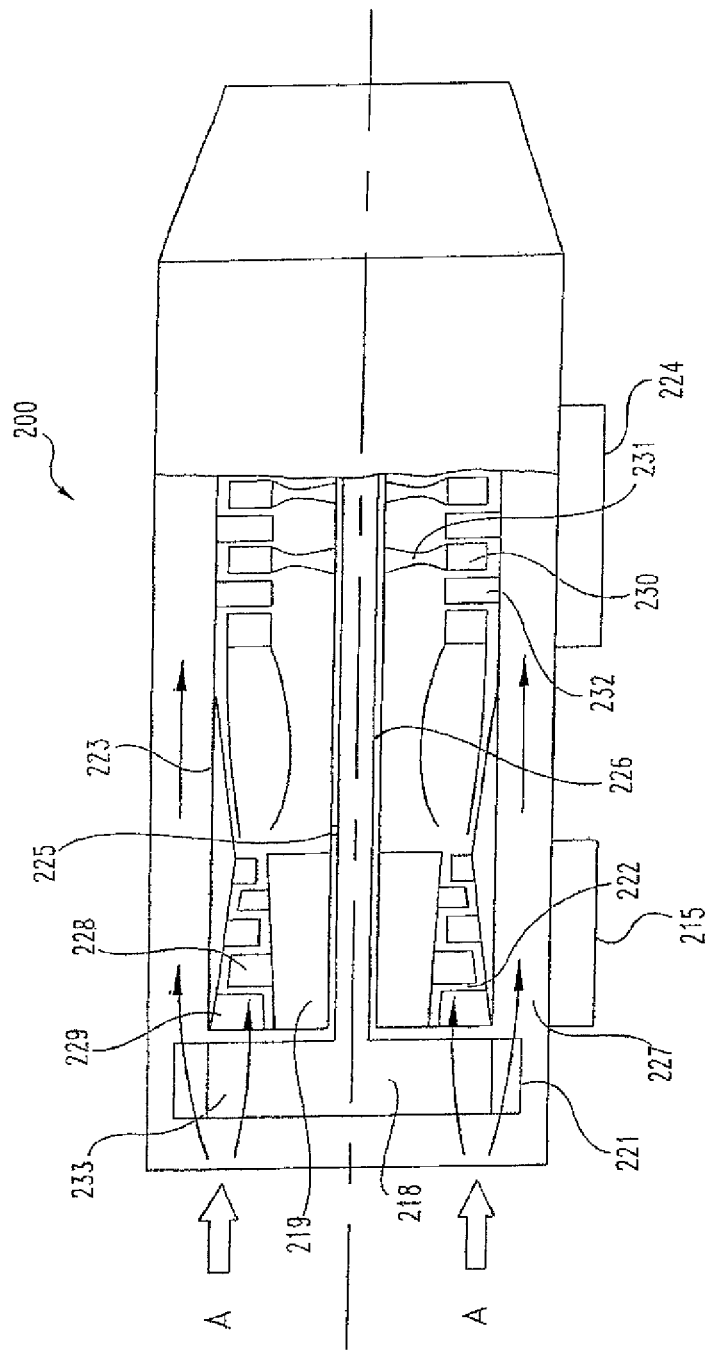
FIG. 2 is an illustrative representation of a gas turbine engine.

With reference to FIG. 2 there is illustrated a schematic view of a gas turbine engine 200 which includes a compression section 215, a combustor section 223, and a turbine section 224 which are integrated together to produce an aircraft flight propulsion engine. In one form, the compression system 215 includes a fan section 221 and a compressor section 222. This type of gas turbine engine is generally referred to as a turbo-fan. One alternate form of a gas turbine engine includes a compressor, a combustor, and a turbine that have been integrated together to produce an aircraft flight propulsion engine without-the fan section.

The compressor section 222 includes a rotor 219 having a plurality of compressor blades 228 coupled thereto. The rotor 219 is affixed to a shaft 225 that is rotatable within the gas turbine engine 220. A plurality of compressor vanes 229 are positioned within the compressor section 222 to direct the fluid flow relative to blades 228. Turbine section 224 includes a plurality of turbine blades 230 that are coupled to a rotor disk 231. The rotor disk 231 is affixed to the shaft 225, which is rotatable within the gas turbine engine 220. Energy extracted in the turbine section 224 from the hot gas exiting the combustor section 223 is transmitted through shaft 225 to drive the compressor section 222. Further, a plurality of turbine vanes 232 are positioned within the turbine section 224 to direct the hot gaseous flow stream exiting the combustor section 223.

The turbine section 224 provides power to a fan shaft 226, which drives the fan section 221. The fan section 221 includes a fan 218 having a plurality of fan blades 233. Air enters the gas turbine engine 220 in the direction of arrows A and passes through the fan section 221 into the compressor section 222 and a bypass duct 227. The term airfoil refers to fan blades, fan vanes, compressor blades, turbine blades, compressor vanes, and turbine vanes unless specifically stated otherwise. Further details related to the principles and components of a conventional gas turbine engine will not be described herein as they are known to one of ordinary skill in the art.

It is important to appreciate that there are a multitude of ways in which the gas turbine engine components can be linked together. For example, additional compressors and turbines could be added with intercoolers connecting between the compressors and reheat combustion chambers could be added between the turbines. A wide variety of additional configurations and variations are also possible as would occur to skilled artisans.

Figure 3:
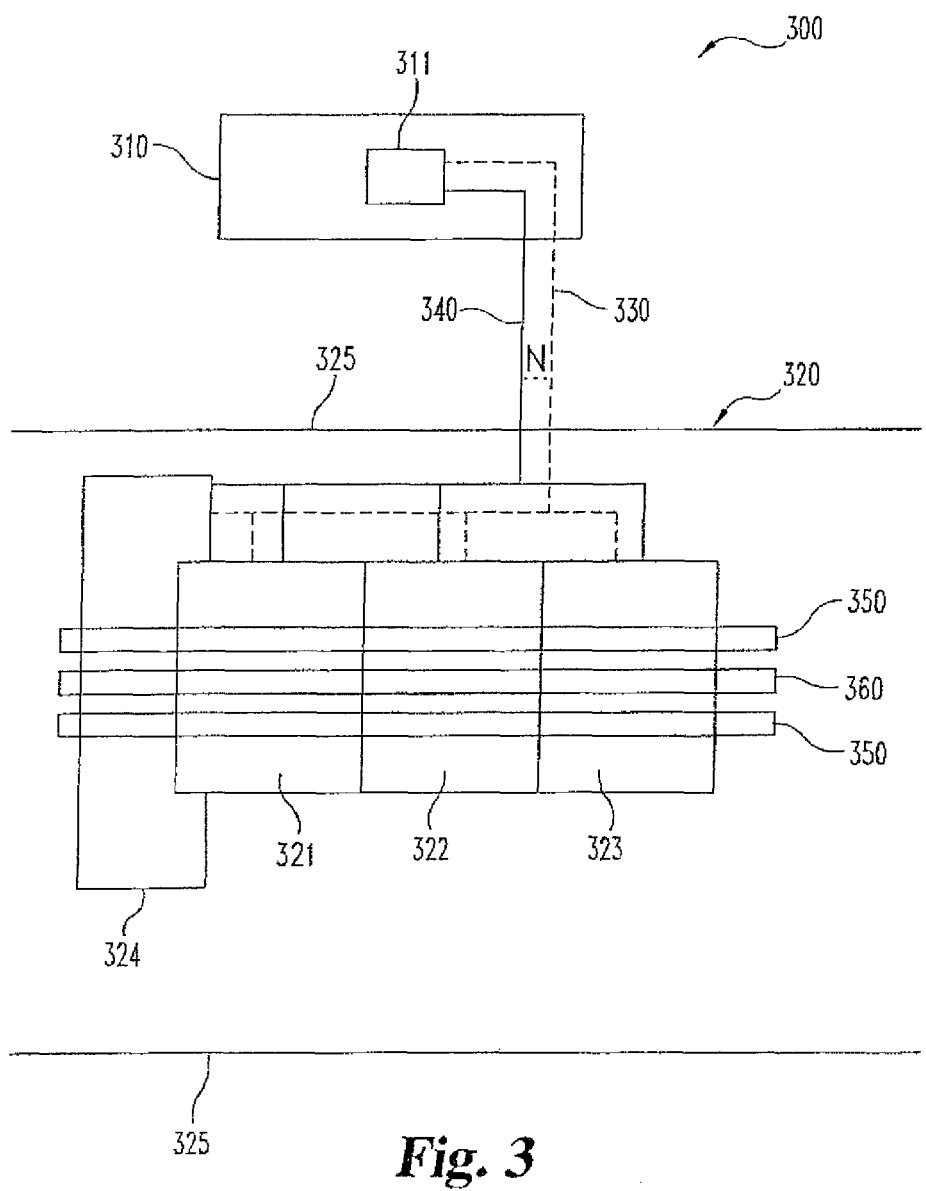
FIG. 3 is a schematic representation of a gas turbine engine subsystem and a control subsystem.

With reference to FIG. 3 there is illustrated system 300 which includes control subsystem 310 and engine subsystem 320 and could also include a variety of additional subsystems as would occur to skilled artisans. Control subsystem 310 includes a control unit 310 which can include a full authority digital electronic control ("FADEC") 311 or any other logic, program, software, hardware, or combination of these and/or other elements operable to receive information and to output control signals. Subsystem 310 is interconnected to engine subsystem 320 with information interconnection 330 and control interconnection 340.

As indicated by ellipsis N there could also be a greater number of interconnections (or fewer in the case of a shared single interconnection) between subsystems 310 and 320. Furthermore, a wide variety of interconnections are contemplated, including, wire, wireless, mechanical, electro-mechanical, electro-magnetic, optical, and combinations of these and other types of interconnections. As illustrated, any or all of the elements of subsystems 310 and/or 320 could be interconnected via one or more interconnections. Additional sub-systems and elements not illustrated could also be similarly interconnected with the illustrated elements and with one another.

Engine subsystem 320 receives information or input from one or more interconnections, such as those just described or others. There can be interconnection between some or all of the various elements and/or subsystems of engine subsystem 320, for example, compressor(s) 321, combustor(s) 322, turbine(s) 323, and/or a load, such as, turbofan 324.

Subsystem 320 also includes shafts 350 and 360 which are driven by turbines and whose output connects to other elements of engine subsystem 320. For example, in the case of a turbo fan, outer shaft 350 outputs to turbofan 324 and inner shaft 360 outputs to compressor 321, a variety of other interconnections, such as those of the alternatives mentioned elsewhere herein and others, are within the scope of the present invention. The foregoing and other elements, and others, can be housed in a housing 325.

Figure 4:
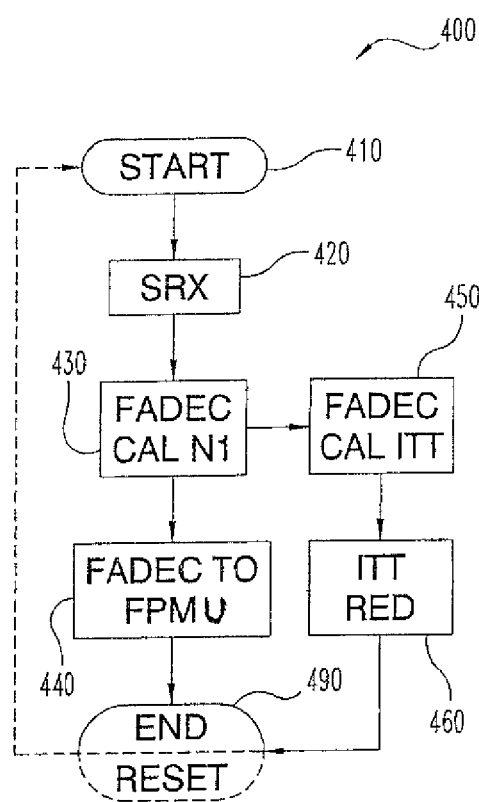
FIG. 4 is a flow diagram representation of steps in a control process.

With reference to FIG. 4 there is shown flow diagram 400 which begins at start operation 410 and proceeds to operation 420 where a signal is received from a sensor, for example, a signal of information relating to an engine temperature, such as inter turbine temperature ("ITT") or another turbine temperature, could be received during an engine operational state where a high pressure output increase is occurring or is commanded. From operation 420 diagram 400 proceeds to operation 430 where a controller, such as a FADEC, calculates a reduction coefficient intended to reduce engine speed at $N_1$ (or simply calculates a reduced engine speed at $N_1$). From operation 430 diagram 400 can proceed to operation 440 where the FADEC sends a signal to a fuel pump metering unit or FPMU to reduce fuel flow. From operation 430, diagram 400 can also proceed to operation 450 where a FADEC or other control means calculates a predictive reduction amount, X, such as an amount to reduce ITT or another temperature, as an objective for the reduction of engine speed at $N_1$. From operation 450, diagram 400 proceeds to operation 460 where the calculated predictive reduction amount, X, is applied to reduce ITT, or another operational aspect, and is phased out over a time period, such as, 1.5 seconds. From either operations 440 and 460, diagram 400 proceeds to state 490 where it either ends or is reset.

Figure 5:
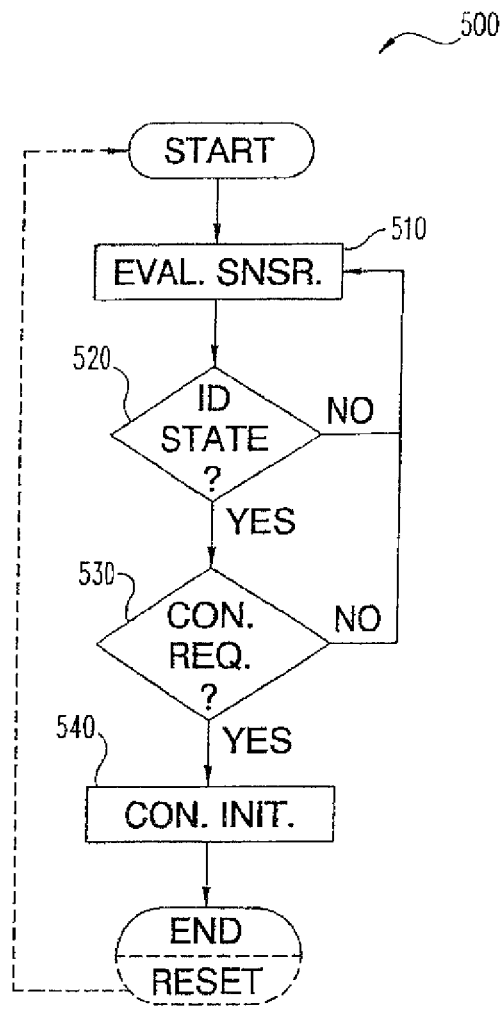
FIG. 5 is a flow diagram representation of steps in a control process.

With reference to FIG. 5 there is shown flow diagram 500 which begins at the START operation and proceeds to operation 510 where information from a sensor (such as a physical sensor, a virtual sensor, or other type of sensor) is received. From operation 510 diagram 500 proceeds to conditional 520 where the identity of a state of a gas turbine engine is monitored. From operation 520 diagram 500 proceeds to conditional 530 where the monitored state is analyzed to determine whether it is predictive or precedes a state indicating a need for engine control. From operation 530 diagram 500 proceeds to operation 540 where control is initiated, for example, by generating and/or outputting a control signal. Also at operation 540, an adjustment to information received from a sensor is made (such as a decrease in received temperature information). From operation 540 diagram 500 proceeds to a state where it is reset or ends. Let it be understood that a variety of alternatives to the foregoing methods are contemplated within the scope of the invention, including methods where the order of events, operations, and/or conditionals is different, such as, by reordering or substantial overlap or concurrent operation.

Figure 6:
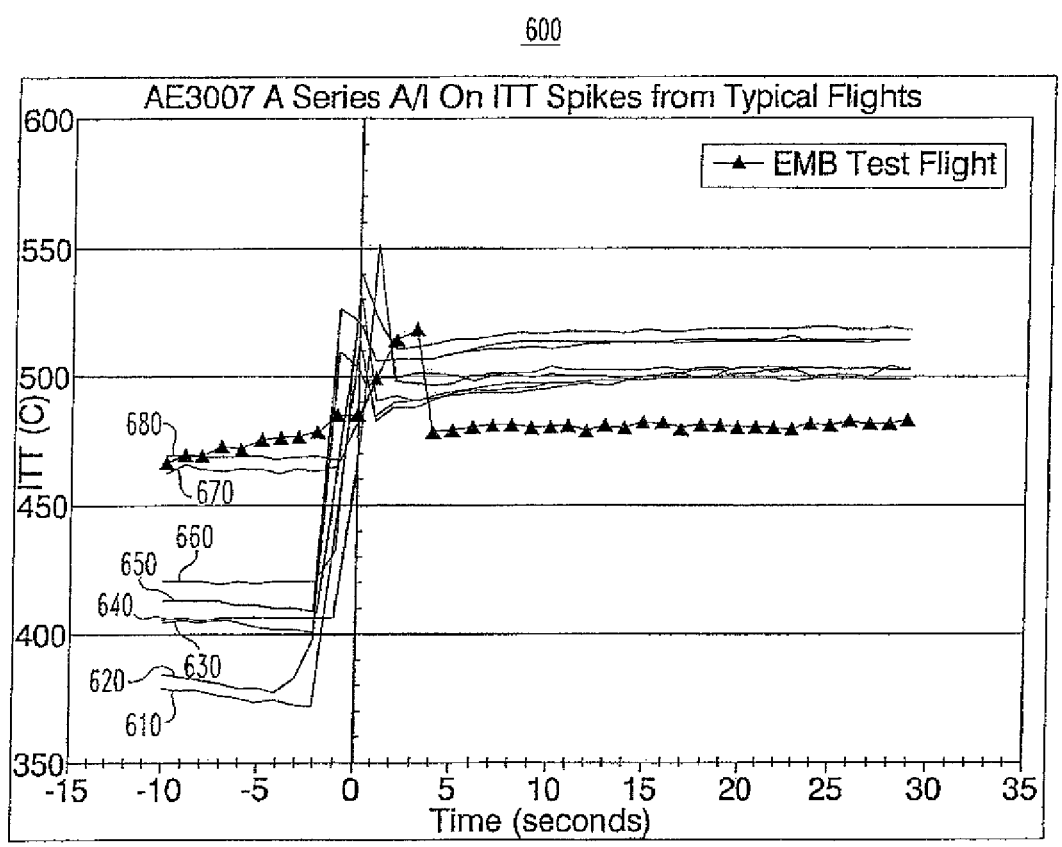
FIG. 6 is a graph of signal information as a function of time.

With reference to FIG. 6 there is shown a graph 600 with time on its horizontal axis and inter-turbine temperature (in Celcius) on its vertical axis. Graph 600 shows the relationship of inter-turbine temperature ("ITT") as it varies with time for a number of different signals 610, 620, 630, 640, 650, 660, 670 and 680. Each of these signals exhibits a spike in ITT before a period of relatively lower and relatively stable ITT. In some cases, spikes such as those of graph 600 are attributable, at lease in part, to mechanical delay in response to engine control signals. The foregoing apparatuses, systems, methods, and other embodiments according to the present invention can be operable to predict such spikes and predict for, correct for, and/or smooth them, among other capabilities.

Exemplary embodiments include control systems, methods, and controllers for gas turbine engines which anticipate changes in turbine temperature based on commanded engine operation and apply predictive adjustments to sensed turbine temperature information. An exemplary adjustment to sensed turbine temperature information includes adjusting for a transient turbine temperature increase, for example, a turbine temperature spike. During gas turbine engine operation an increased load may be applied to the engine. In some embodiments an increased load is applied to an engine spool, for example, the high pressure spool, to drive aircraft systems or other auxiliary systems. In some embodiments an increased load is applied by extracting bleed air for anti-ice operation or for other operations. Some embodiments include multiple increased loads applied to a gas turbine engine. If commanded engine speed remains unchanged the overall load on the engine increases and turbine temperature can increase above a defined level such as an engine yellow band or a red line level. To avoid operating the engine above the defined turbine temperature level, an engine controller calculates a reduction in engine output to offset the increased load applied to the engine and commands a reduced level of engine output. In some embodiments the reduction in engine output is a reduction in engine thrust. In some embodiments the reduction in engine output is a reduction in rotational engine speed. In some embodiments the reduction in engine output is a reduction in rotational speed of the high pressure spool. In some embodiments the reduction in engine output is a reduction in fuel provided to the engine.

In exemplary embodiments there is a lag in the mechanical response of the engine to the commanded output reduction which results in a transient turbine temperature increase, for example, a turbine temperature spike. A sensor outputs turbine temperature information which reflects the transient increase in turbine temperature. The output turbine temperature information is provided to the engine controller. The engine controller adjusts the turbine temperature information provided by the sensor to offset, counteract or reduce the transient temperature increase. Adjustment of the turbine temperature information provided by the sensor may be accomplished in a number of manners.

In some embodiments the engine controller calculates an adjustment to the sensed turbine temperature. In some embodiments the engine controller obtains an adjustment to the sensed turbine temperature from a look up table based upon a number of variables, for example, throttle position, altitude, and/or throttle change. In some embodiments the engine controller predicts a post-transient decrease in turbine temperature based upon a commanded decrease in engine output and reduces the magnitude of the turbine temperature information provided by the sensor based upon the magnitude of the predicted decrease. In some embodiments the reduction is applied for a specified duration. In some embodiments the reduction is applied for a period based upon a lag in mechanical response of the engine to commanded reduction in engine speed. In some embodiments the magnitude of the reduction is limited. Some embodiments limit the magnitude adjustment based upon values in a look up table and may account for multiple variables including altitude and engine throttle selected by a pilot. In some embodiments the magnitude of the reduction is scaled over a time period to approximate an inverse of an expected transient temperature increase. In some embodiments the reduction is offset in time to account for a lag response time.

Some exemplary embodiments compensate for transient turbine temperature increases attributable to multiple loads imposed on the engine, for example, multiple bleeds may contribute to an overall observed temperature spike. One such embodiment calculates an adjusted turbine temperature by measuring a turbine temperature and subtracting a first bleed reduction value and subtracting a second bleed reduction value. The first bleed reduction value is offset by a first time constant which accounts for a delay in the effect created by the first bleed, and is also scaled as a function of time to produce an offset which is or approximates the inverse of the portion of the transient temperature spike attributable to the first bleed. The second bleed reduction value is offset by a second time constant which accounts for a delay in the effect created by the second bleed, and is also scaled as a function of time to produce an offset which is or approximates the inverse of the portion of the transient temperature spike attributable to the second bleed. By subtracting both the first bleed reduction value and the second bleed reduction value from a measured turbine temperature, an adjusted turbine temperature is provided which reduces the transient temperature spikes associated with two bleeds. Some embodiments may include additional bleed reduction values for additional bleeds or other loads.

Some exemplary embodiments compensate for transient temperature spikes while simultaneously accounting for increase throttle commands from a pilot. One such embodiment calculates a transient temperature increase from a measured increase in turbine temperature and subtracts a temperature increase expected from a commanded throttle increase. The temperature increase expected from a commanded throttle increase is calculated by scaling the change in commanded throttle by a term that accounts for the starting throttle position, the aircraft altitude, and/or the magnitude of the throttle change. The scalar may be provided from a look up table is provided which specifies the scalar in one or more dimensions, for example, throttle position, change in throttle position, change throttle position normalized by the change in turbine temperature, and/or altitude. Another such embodiment determines a transient temperature increase from a look up table and subtracts a temperature increase expected from a commanded throttle increase. The temperature increase expected from a commanded throttle increase is calculated by scaling the change in commanded throttle by a term that accounts for the starting throttle position, the aircraft altitude, and/or the magnitude of the throttle change. The scalar may be provided from a look up table which specifies the scalar in one or more dimensions, for example, throttle position, change in throttle position, change throttle position normalized by the change in turbine temperature, and/or altitude.

Some exemplary embodiments impose a limit on the magnitude of the adjustment or reduction of measured turbine temperature. In one such embodiment, a first adjustment value is calculated by subtracting a current turbine temperature value from an initial turbine temperature value. The first adjustment value may be scaled to account for a partial contribution to an overall transient temperature increase in the case of multiple loads. A term to account for a change in pilot commanded throttle change may also be subtracted. A second adjustment value is determined from a look up table which specifies subtracting a current turbine temperature value from an initial turbine temperature value. The second adjustment value may be scaled to account for a partial contribution to an overall transient temperature spike in the case of multiple loads. A term to account for a change in pilot commanded throttle may also be subtracted. A limit on the magnitude of the adjustment of measured turbine temperature is calculated by taking the minimum of the first adjustment value and the second adjustment value. A further limit may be imposed to set the adjustment to zero if the result of this calculation is a negative value.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   a gas turbine engine including a compressor, a combustor, and a turbine;
   a sensor operable to provide sensed turbine temperature information; and a controller operable to control operation of the gas turbine engine and to receive sensed turbine temperature information from the sensor;

wherein during operation of the system the controller reduces engine speed in response to an increased load applied to the engine to control turbine temperature, and the controller adjusts the sensed turbine temperature information to reduce a transient turbine temperature increase, the reduction being subject to a magnitude limitation and a time limitation;

wherein the magnitude of the reduction is scaled as a function of time to approximate an inverse of the transient temperature increase.

2. A system according to claim 1 wherein the time limitation is based upon a mechanical response time of the engine to a commanded reduction in engine speed.

3. A system according to claim 1 further comprising an aircraft wherein the engine is operable to propel the aircraft and the increased load is applied to drive one or more systems of the aircraft.

4. A system according to claim 1 wherein the sensed turbine temperature is an inter turbine temperature.

5. A system according to claim 1 wherein the increased load is applied by extracting bleed air.

6. A system according to claim 1 wherein the increased load is applied by extracting horsepower from an engine spool.

7. A system according to claim 1 wherein the magnitude limitation is the lesser of a value obtained from a measurement and a predetermined value.

8. A system according to claim 7 wherein the time limitation and the magnitude limitation are determined based upon a first increased load applied to the engine and a second increased load applied to the engine.

9. A system comprising:
a gas turbine engine including a compressor, a combustor, and a turbine;
a sensor operable to provide sensed turbine temperature information; and
a controller operable to control operation of the gas turbine engine and to receive sensed turbine temperature information from the sensor;
wherein during operation of the system the controller reduces engine speed in response to an increased load applied to the engine to control turbine temperature, and the controller adjusts the sensed turbine temperature information to reduce a transient turbine temperature increase, the reduction being subject to a magnitude limitation and a time limitation;
wherein the magnitude limitation is the lesser of a value obtained from a measurement and a predetermined value.

10. A system according to claim 9 wherein the time limitation is correlated with a mechanical response time of the engine to a commanded reduction in engine speed.

11. A system according to claim 9 wherein the magnitude of the reduction is scaled to approximate an inverse of the transient temperature increase.

12. A system according to claim 9 further comprising an aircraft wherein the engine is operable to propel the aircraft and the increased load is applied to drive one or more systems of the aircraft.

13. A system according to claim 9 wherein the sensed turbine temperature is an inter turbine temperature.

14. A system according to claim 9 wherein the increased load is applied by extracting bleed air.

15. A system according to claim 9 wherein the increased load is applied by extracting horsepower from an engine spool.

16. A system according to claim 9 wherein the time limitation and the magnitude limitation are based upon a first increased load applied to the engine and a second increased load applied to the engine.

17. A system comprising:
a gas turbine engine including a compressor, a combustor, and a turbine;
a sensor operable to provide sensed turbine temperature information; and
a controller operable to control operation of the gas turbine engine and to receive sensed turbine temperature information from the sensor;
wherein during operation of the system the controller reduces engine speed in response to an increased load applied to the engine to control turbine temperature, and the controller adjusts the sensed turbine temperature information to reduce a transient turbine temperature increase, the reduction being subject to a magnitude limitation and a time limitation;
wherein the time limitation is based upon a mechanical response time of the engine to a commanded reduction in engine speed.

18. A system according to claim 17 wherein the magnitude of the reduction approximates an inverse of the transient temperature increase.

19. A system according to claim 17 further comprising an aircraft wherein the engine is operable to propel the aircraft and the increased load is applied to drive one or more systems of the aircraft.

20. A system according to claim 17 wherein the sensed turbine temperature is an inter turbine temperature.

21. A system according to claim 17 wherein the increased load is provided by extracting bleed air.

22. A system according to claim 17 wherein the increased load is provided by extracting horsepower from an engine spool.

23. A system according to claim 17 wherein the magnitude limitation is based upon one of a value obtained from a measurement and a predetermined value.

24. A system according to claim 23 wherein the time limitation and the magnitude limitation are determined based upon a first increased load applied to the engine and a second increased load applied to the engine.

* * * * *